United States Patent
Porter

(10) Patent No.: US 6,669,212 B2
(45) Date of Patent: Dec. 30, 2003

(54) CART WITH COLLAPSIBLE RECEPTACLE AND METHOD OF USE

(75) Inventor: Terril Porter, Richmond, VA (US)

(73) Assignee: Rehrig International, Inc., Richmond, VA (US)

(*) Notice: Subject to any disclaimer, the term of this patent is extended or adjusted under 35 U.S.C. 154(b) by 0 days.

(21) Appl. No.: 10/273,892

(22) Filed: Oct. 21, 2002

(65) Prior Publication Data

US 2003/0098560 A1 May 29, 2003

Related U.S. Application Data

(63) Continuation of application No. 29/150,661, filed on Nov. 28, 2001, now Pat. No. Des. 468,880.

(51) Int. Cl.$^7$ .................................................. B62B 3/02
(52) U.S. Cl. ........................... 280/33.991; 280/33.993; 280/47.34
(58) Field of Search ................. 280/33.991, 33.992, 280/33.993, 33.994, 33.995, 33.996, 33.997, 33.998, 47.34, 47.38, 79.2

(56) References Cited

U.S. PATENT DOCUMENTS

| | | | | |
|---|---|---|---|---|
| 2,020,766 A | * | 11/1935 | Brown | 280/639 |
| 2,662,661 A | * | 12/1953 | Goldman | 220/486 |
| 3,375,018 A | * | 3/1968 | Close | 280/33.991 |
| 3,497,234 A | * | 2/1970 | Schray | 280/33.993 |
| 3,614,133 A | * | 10/1971 | Ganci et al. | 280/33.991 |
| D240,297 S | | 6/1976 | Trubiano | |
| 4,097,056 A | * | 6/1978 | Castellano | 280/47.35 |
| 4,765,644 A | * | 8/1988 | Bell | 280/641 |
| D331,135 S | | 11/1992 | Lewandowski et al. | |
| 5,203,578 A | * | 4/1993 | Davidson et al. | 280/33.991 |
| 5,277,473 A | * | 1/1994 | Kelly et al. | 297/250.1 |
| D360,393 S | | 7/1995 | Lewandowski | |
| D366,546 S | | 1/1996 | Schaub et al. | |
| 5,544,904 A | * | 8/1996 | Maher | 280/47.35 |
| 5,595,394 A | * | 1/1997 | Adamson | 280/33.993 |
| 5,662,342 A | * | 9/1997 | Basharat | 280/33.997 |
| D386,873 S | | 11/1997 | D'Estaintot et al. | |
| 5,794,952 A | * | 8/1998 | Kern et al. | 280/33.991 |
| 5,836,422 A | * | 11/1998 | Hurst | 186/63 |
| 5,915,722 A | * | 6/1999 | Thrasher et al. | 280/649 |
| 5,961,133 A | * | 10/1999 | Perry | 280/33.993 |
| 6,126,181 A | * | 10/2000 | Ondrasik | 280/33.991 |
| 6,170,854 B1 | * | 1/2001 | Maher et al. | 280/648 |
| 6,328,329 B1 | * | 12/2001 | Smith | 280/639 |

* cited by examiner

Primary Examiner—Frank Vanaman
Assistant Examiner—Christopher Bottorff
(74) Attorney, Agent, or Firm—McGuireWoods LLP

(57) ABSTRACT

A cart having a frame member including upright and lateral frame portions. A platform is attached to the lateral frame portion and a stationary seat assembly is secured to the upright frame portion. The stationary seat assembly includes a rearwardly facing stationary seat, a handle and a safety bar between the seat and the handle. A pivoting mechanism is mounted to the lateral frame portion remote from the upright frame portion. The pivoting mechanism is moveable between a substantially upright position and a retracted position and is located relative to a back portion of the seat. A flexible receptacle is attached to the pivoting mechanism, and moves between an open and collapsed position when the pivoting mechanism is moved between the substantially upright and the retracted position, respectively. The stationary seat and the platform are accessible when the pivoting mechanism is in the substantially upright position or the retracted position.

23 Claims, 6 Drawing Sheets

CART WITH COLLAPSIBLE RECEPTACLE AND METHOD OF USE

CROSS REFERENCE TO RELATED APPLICATIONS

The present application is a continuation of U.S. application Ser. No. 29/150,661 filed Nov. 28, 2001; now issued as U.S. Pat. No. D468,880, and incorporated in its entirety herein.

BACKGROUND OF THE INVENTION

1. Field of the Invention

The present invention generally relates to a cart and, more particularly, to a cart having a mechanism allowing a receptacle or bag to be deployed between an open position and a closed position.

2. Background Description

There are many types of carts and strollers that are currently in use. These carts range from conventional shopping carts, to convertible strollers and cart configurations. In the latter category, the strollers and carts typically have a flexible type bag that can be retracted and opened via some mechanism. However, it has been found that these types of convertible strollers and cart configurations do not provide very much versatility. For example, an infant seat may be placed on the stroller, but the cart cannot then be used with the bag in the open position. In some types of configurations, the seat is moveable which adds to the complexity of the apparatus.

By way of more specific example, U.S. Pat. No. 5,544,904 shows a stroller used in department stores and shopping malls. In this type of stroller, the stroller portion comprises a series of frame members that are joined in any conventional fashion. A forwardly facing seat is secured to the frame members, and includes opposite armrests, i.e., side portions. One of the frame members is generally U-shaped, and extends beneath opposite armrests of the seat. A pair of handle tubes have portions which extend beneath the frame member. The shopping cart portion, on the other hand, comprises a collapsible receptacle that includes a mesh bag topped by a fabric collar. The collar is secured to a pivotal bar by means of fabric sleeves. In use as a shopping cart, the pivotal bar is pivoted to the stowed orientation, with the mesh bag collapsed behind the seat. In use with the stroller function, the pivotal bar is pivoted forward over the seat, deploying the mesh bag over the seat. Thus, the combined stroller and shopping cart cannot be used as a shopping cart and infant carrier, simultaneously.

In another type of stroller, for example, as shown in U.S. Pat. No. 6,170,854, the seat is moveable from a deployed position to a stowed position displaced from the deployed position. To use the bag, the seat must be moved. This lacks the versatility needed in modem applications, where a child seat is needed simultaneously with the shopping cart.

The present invention is directed to overcoming one or more of the problems as set forth above.

SUMMARY OF THE INVENTION

In one aspect of the present invention, a cart is provided which includes a frame member having an upright frame portion and a lateral frame portion. A platform is attached to the lateral frame portion and a stationary seat assembly is rigidly secured to the upright frame portion. The stationary seat assembly includes a rearwardly facing stationary seat having a backrest, a handle positioned towards a front portion of the rearwardly facing stationary seat, and a safety bar positioned between the rearwardly facing stationary seat and the handle. A pivoting mechanism is hingedly mounted to the lateral frame portion remotely from the upright frame portion. The pivoting mechanism is moveable between a substantially upright position and a retracted position and is located relative to a back portion of the backrest such that the rearwardly facing stationary seat is positioned between the handle and the pivoting mechanism. A flexible receptacle is attached between the pivoting mechanism and the stationary seat assembly or the upright frame member. The pivoting mechanism moves the flexible receptacle between an open position and a collapsed position when the pivoting mechanism is moved between the substantially upright position and the retracted position, respectively. The rearwardly facing stationary seat and the platform is accessible for use when the pivoting mechanism is in either the substantially upright position or the retracted position.

In embodiments, the stationary seat assembly is an integrally formed assembly and mounting brackets are mounted to the lateral frame member such that the pivoting mechanism is hingedly mounted to the mounting brackets. Stays may also be provided in order to prevent the pivoting mechanism from extending past the substantially upright position. The receptacle may also prevent over extension. The pivoting mechanism may include a transverse bar positioned below the handle in the substantially upright position or the retracted position, and which is nested within an indentation of the backrest when in the retracted position. The platform may be accessible in both a horizontal and vertical direction when the pivoting mechanism is in either the substantially upright position or the retracted position.

In yet another aspect of the present invention, the cart includes a frame member rotatably mounted to wheels. A stationary seat assembly is rigidly secured to the frame member. A pivoting mechanism is hingedly mounted to the frame member remotely from an upright portion of the frame member. The pivoting mechanism is moveable between a substantially upright position and a retracted position, and is located relative to a back portion of the rearwardly facing stationary seat of the stationary seat assembly. A flexible receptacle is attached to the pivoting mechanism. The pivoting mechanism moves the flexible receptacle between an open position and a closed position when the pivoting mechanism is moved between the substantially upright position and the retracted position, respectively. The rearwardly facing stationary seat is accessible for use when the pivoting mechanism is in either the substantially upright position or the retracted position.

In still yet another aspect of the invention, a method is provided for retracting a pivoting mechanism of a cart and collapsing a bag or a flexible receptacle of the cart. The method includes providing a first and a second cart, each having a collapsible receptacle and pivoting mechanism. The cart further includes a frame member including an upright frame portion and a lateral frame portion and a stationary seat assembly rigidly secured to the upright frame portion. The method further includes moving the first cart in a first direction a predetermined distance towards the stationary seat assembly of the second cart such that:

1. initially the stationary seat assembly of the second cart begins to contact the pivoting mechanism of the first cart;
2. then the stationary seat assembly begins to move the pivoting mechanism of the first cart towards the stationary seat of the first cart due to the continued movement of the first cart in the first direction and the contact between the pivoting mechanism of the first cart and the seat assembly of the second cart; and
3. the first cart is moved the predetermined distance such that the contact between the pivoting mechanism of the first cart and the seat assembly of the second cart moves the pivoting mechanism to the retracted position resulting in the flexible receptacle being collapsed or closed, the flexible receptacle and the pivoting mechanism of the first cart being positioned between the stationary seat assembly of both the first cart and the second cart.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention is directed to a cart having a receptacle or bag portion capable of being placed in a deployed (opened) position or placed in a stowed (closed) position. In both the deployed and stowed positions, a child seat remains accessible for use by a child. This allows for additional versatility by allowing a child to sit within the cart of the present invention regardless of the position of the bag. In the open or deployed configuration, the user of the present invention may simultaneously use both the bag and the seat. In other words, a child may be seated within the seat while items are placed in the open bag. In this open position, a bottom storage platform is also accessible for providing additional storage area. In the closed or stowed position, the user may simultaneously use both the bottom storage platform and the child seat, in addition to other features described below.

Embodiments of the Cart of the Present Invention

Figure 1:
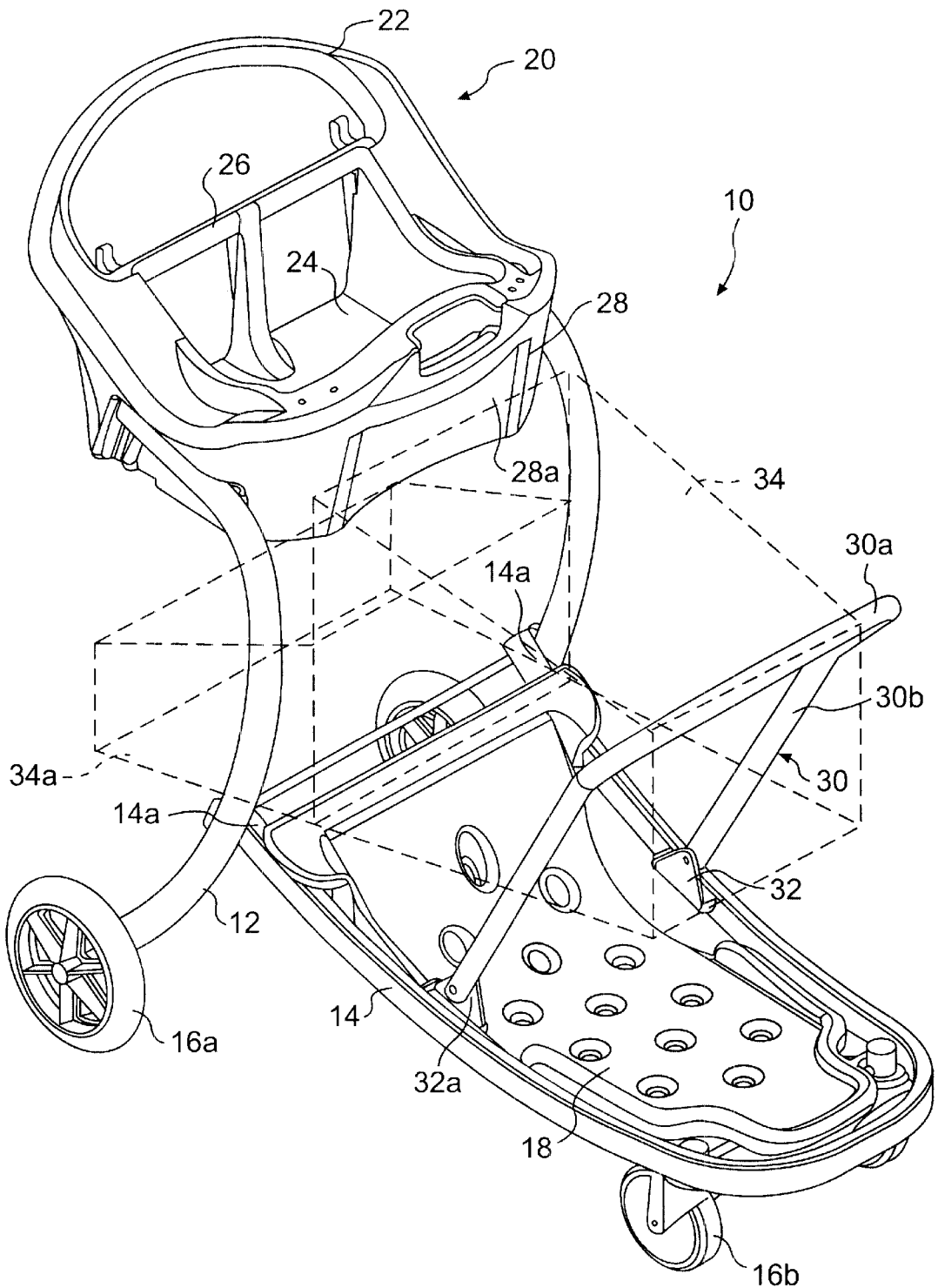
FIG. 1 shows a perspective view of the cart of the present invention with the receptacle in a deployed position.

Referring now to FIG. 1, a cart of the present invention is shown. The cart is generally depicted as reference numeral 10 and includes frame members 12, 14 supported by a set of rear wheels 16a and a set of front wheels 16b. The wheels 16a, 16b may rotate about axles. The wheels 16a may or may not move relative to the frame member 12; whereas, the wheels 16b preferably pivot about a vertical axis thus permitting easy guiding of the cart 10.

In embodiments, the frame member 12 includes substantially upright frame members and the frame member 14 is a U-shaped frame member preferably positioned substantially lateral to or at a right angle with respect to the upright frame members 12. The legs 14a of the U-shaped frame member 14 are each attached to the respective upright frame members 12 in any conventional manner. Those of skill in the art should recognize that the frame member 14 may alternatively be a single frame member or discrete, individual members. In embodiments, the frame members 12, 14 may be made of plastic, resins, aluminum, alloys, or other known materials.

Still referring to FIG. 1, a storage platform 18 is mounted to the U-shaped frame member 14 and is used for additional storage. A handle and seat assembly generally depicted as reference numeral 20 is rigidly mounted to the ends of the upright frame members 12. The assembly 20 is preferably molded from plastic and is rigidly secured to the frame members 12. The assembly 20, in embodiments, cannot be readily removed and remains in a stationary position with respect to the frame members 12, 14 regardless of the cart configuration, i.e., closed or opened position of the bag. The assembly 20 includes a handle 22 and an integrally formed seat portion 24. The seat portion 24 is maintained in a stationary, fixed open position, i.e., not retractable between an open and a closed position, and is rearwardly facing with respect to the cart 10. A safety bar 26 is positioned forwardly of the seat portion 24, and a backrest portion 28 is positioned at a rear portion of the seat portion 24. A rear of the backrest portion 28 may include a depression or indentation 28a. In embodiments, the backrest portion 28 as well as the safety bar 26 and the handle 22 may be integrally formed with the seat portion 24.

Figure 3:
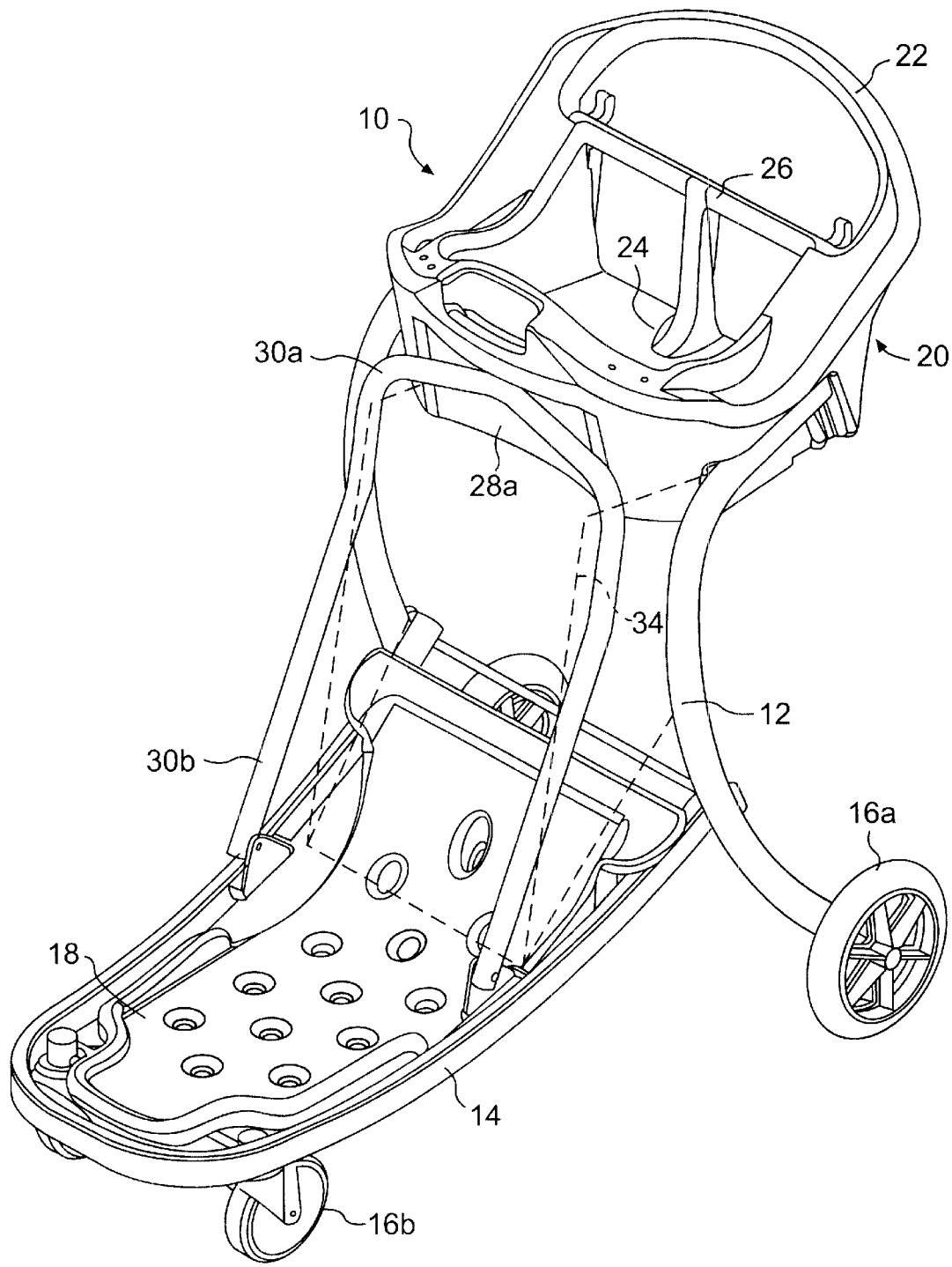
FIG. 3 shows a perspective view of the cart of the present invention with the receptacle in a stowed position.

FIG. 1 further shows a pivoting U-shaped bar 30 pivotally or hingedly mounted to a bracket 32 mounted to the U-shaped frame member 14, at a distance from the upright frame members 12. The pivoting U-shaped bar 30 is displaceable from a generally upright position (FIG. 1), preferably at a slight angle away from the frame members 12, to a rearwardly retracted position, proximate to the backrest portion 28 (FIG. 3). An optional stay 32a may be used to limit the angle of the pivoting U-shaped bar 30. In both the upright and retracted positions, the pivoting U-shaped bar 30 is positioned relative to a front portion of the cart 10 and hence rearwardly of the rearwardly facing seat portion 24. Said otherwise, the pivoting U-shaped bar 30 is positioned to the rear of the backrest portion 28, regardless of the position of the pivoting U-shaped bar 30. In the stowed position, in embodiments, a transverse portion 30a of the pivoting U-shaped bar 30 may be positioned within the indentation 28a. This may contribute to easy stowing and more efficient nesting of carts.

A bag 34 or other type of collapsible receptacle such as, for example, a fabric bag or a mesh bag with a fabric collar or other flexible type material, is attached between the pivoting U-shaped bar 30 and the assembly 20. The bag 34 or other type of collapsible receptacle may alternatively be attached between or around portions of the pivoting U-shaped bar 30 and the upright frame members 12. That is, in embodiments, the bag 34 may be attached between or about upright members 30b of the pivoting U-shaped bar 30 and a portion of the backrest portion 28 or the upright frame members 12 or both or any combination thereof. In the upright position, the bag 34 or other type of receptacle is deployed (i.e., in an open position) so that items can be stored therein. In this position, the platform 18 remains accessible, both vertically and horizontally. Also, in the upright position, the transverse portion 30a of the pivoting U-shaped bar 30 may be lower than the handle 26. The bag 34 may be used to prevent the pivoting U-shaped bar 30 from extending past the upright position. An auxiliary bag 34a or an extension to the bag 34 may extend beneath the assembly 20. This auxiliary bag 34a may be separately opened and closed independent of the bag 34 or, alternatively, opened and closed simultaneously with the bag 34.

Figure 2:
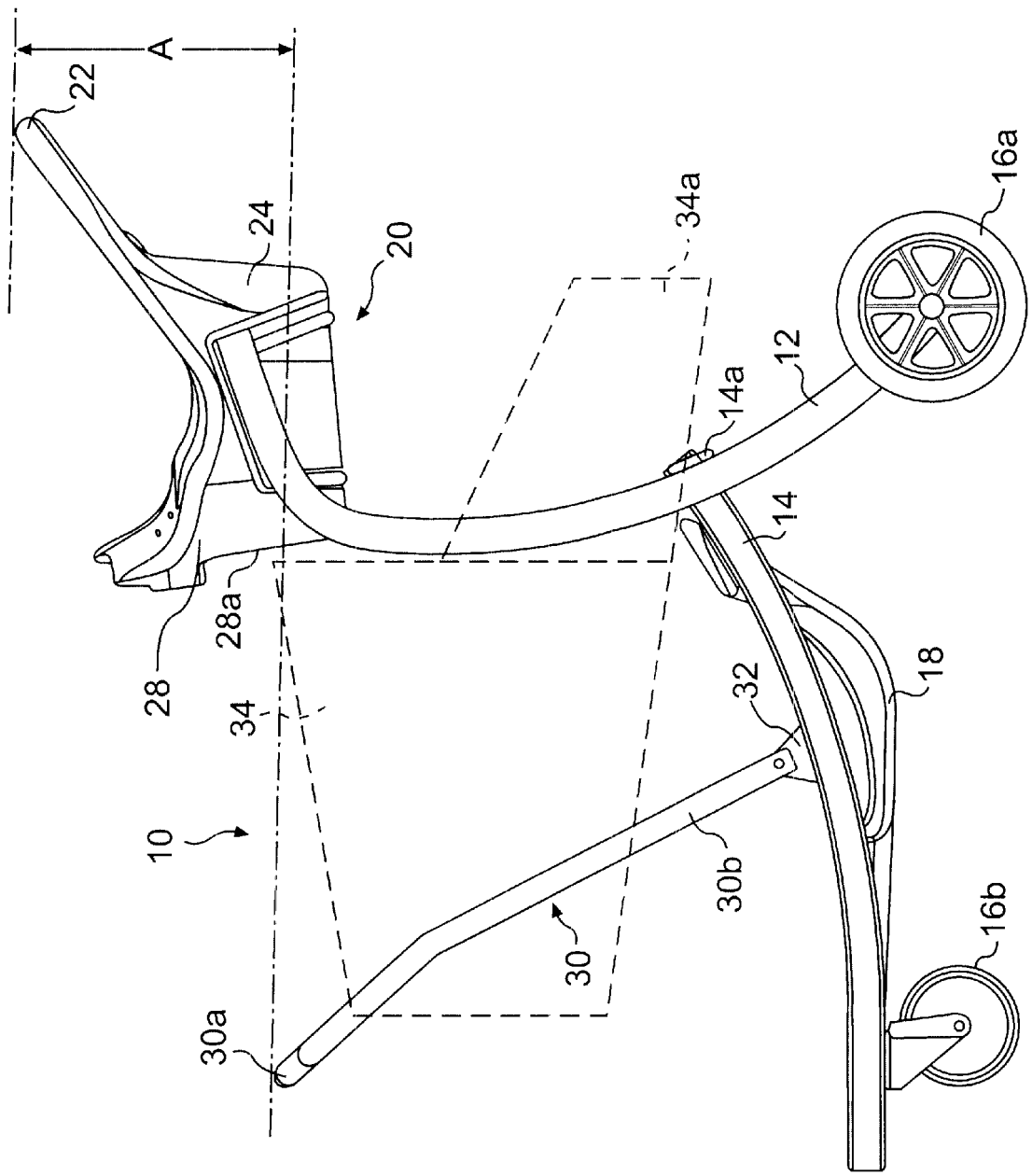
FIG. 2 shows a side view of the cart of the present invention with the receptacle in a deployed position.

FIG. 2 shows a side view of the cart 10 of the present invention with the bag 34 in a deployed or open position. As seen, the transverse portion 34 of the pivoting U-shaped bar 30 is lower than the handle 22 by a distance "A". In the deployed position, the lower platform 18 remains accessible for the storage of additional items. In fact, in embodiments, a front portion of the platform 18 is completely unencumbered; that is, the bag 34 does not extend to the front portion of the platform 18. However, it should be understood by those of skill in the art, that the bag 34 may extend to the front portion of the platform 18 by positioning the mounting bracket 32 at a more remote location from the upright frame members 12.

As further seen in FIG. 2, the seat portion 24 remains accessible when the pivoting U-shaped bar 30 is in the upright position and the bag is in the open position. In this manner, a child can be placed therein. Those of ordinary skill in the art should further recognize that the pivoting U-shaped bar 30, in the upright position, eliminates the need for any further support system for the bag 34. That is, the pivoting U-shaped bar 30, in the generally upright position, is capable of fully supporting any loads within the bag 34 without collapsing or bending. This is mainly due to the mounting position of the pivoting U-shaped bar 30 on the U-shaped frame member 14 (i.e., enabling the pivoting U-shaped bar 30 to be in a generally upright position when the bag 34 is deployed).

FIG. 3 shows the cart with the bag in the stowed position. This position may also be referred to as a closed position. In this stowed position, the bag 34 is retracted or closed, exposing the platform 18 extending between the legs of the U-shaped frame member 14. In the stowed position, the pivoting U-shaped bar 30 rests against the rear portion of the backrest 28 of the rearwardly facing seat 24. In embodiments, the transverse 30a portion of the pivoting U-shaped bar 30 may be nestled within the indentation 28a. The seat 24 remains accessible for use and further remains positioned between the handle 22 and the pivoting U-shaped bar 30. The storage platform 18 allows horizontal and vertical access in either the deployed or stowed position of the bag 34. At all times, the seat portion 24 remains in an accessible position, and the pivoting U-shaped bar 26 remains forwardly from the seat portion 24.

In Operation

In one embodiment of operation, the bag may be positioned in a open or a closed position. Starting from the closed position, the pivoting U-shaped bar 30 rests against the rear portion of backrest 28 of the seat portion 24. In this position, the seat remains between the pivoting U-shaped bar 30 and the handle 22. The platform 18 is also accessible. To open the bag 34, a user moves the pivoting U-shaped bar 30 to the open position. In this position, the bag as well as the platform 18 are accessible for use. To close the bag, the user moves the pivoting U-shaped bar 30 towards the rear of the cart 10 until the transverse portion 30a rests against the rear of the backrest portion 28. At this time, the platform 18 is substantially completely exposed, the seat 24 still remains accessible and the bag is in the closed position.

Figure 4A:
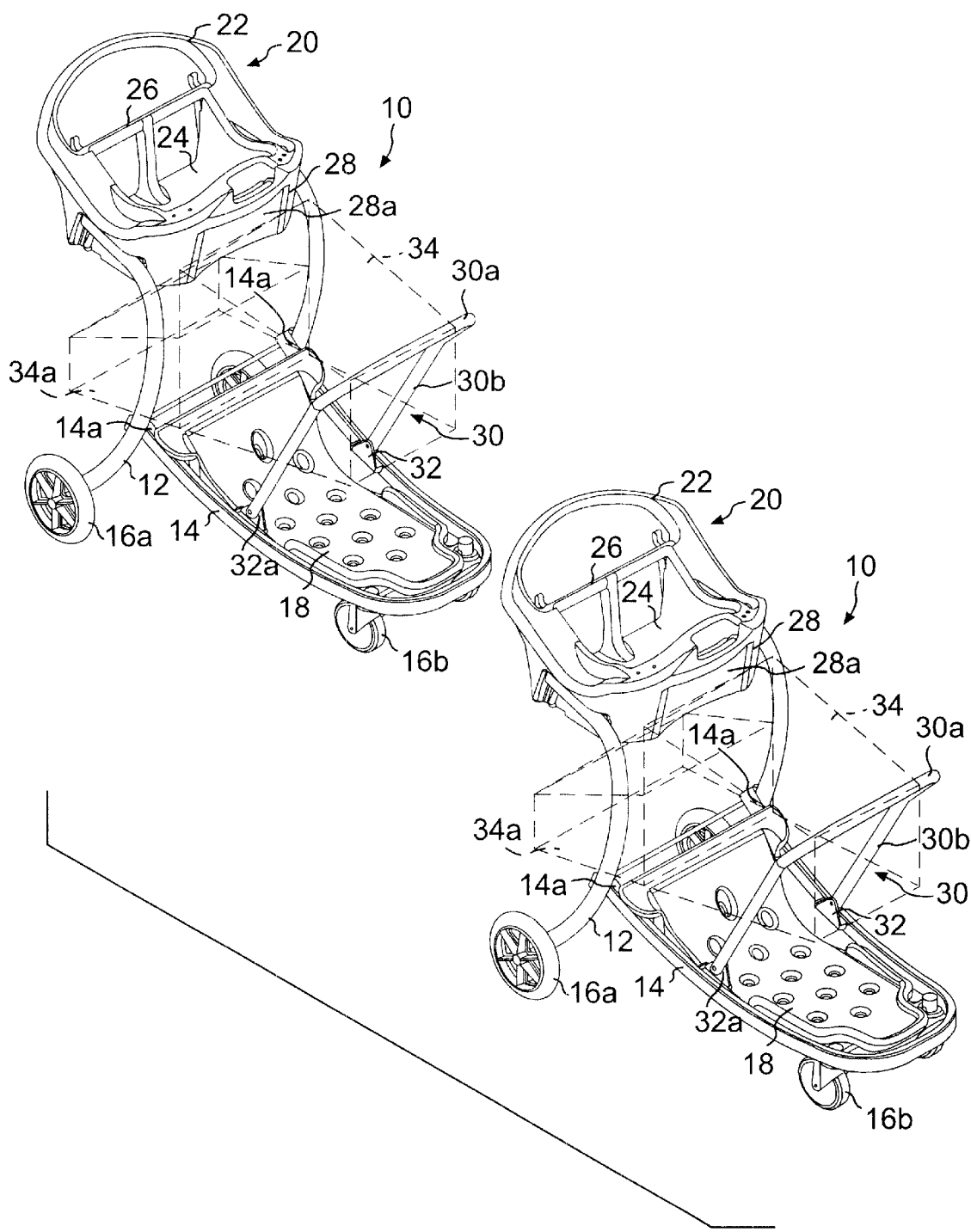
FIGS. 4a–4c show steps of carts of the present invention being nested together to collapse the receptacle.
Figure 4B:
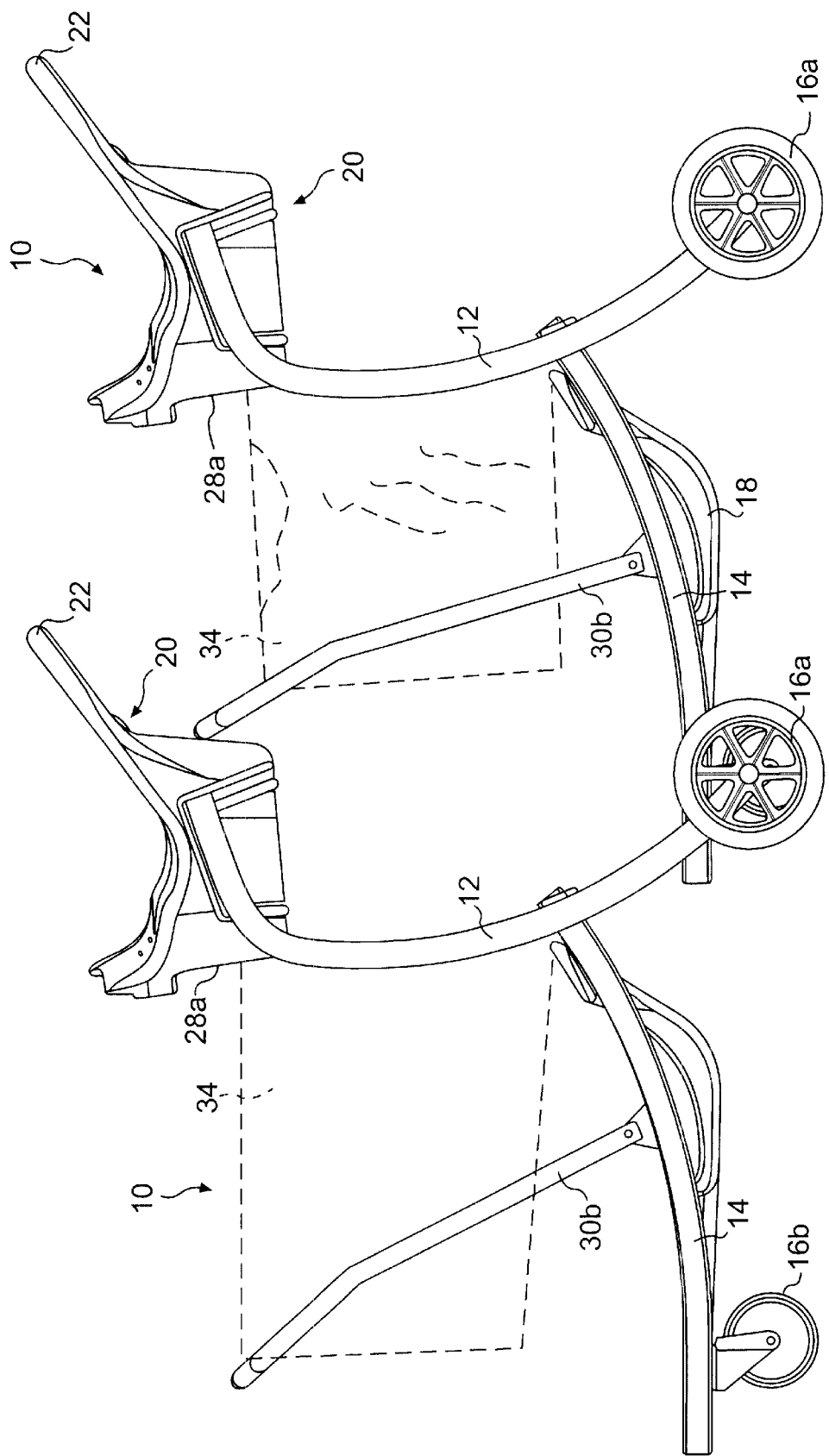
Figure 4C:
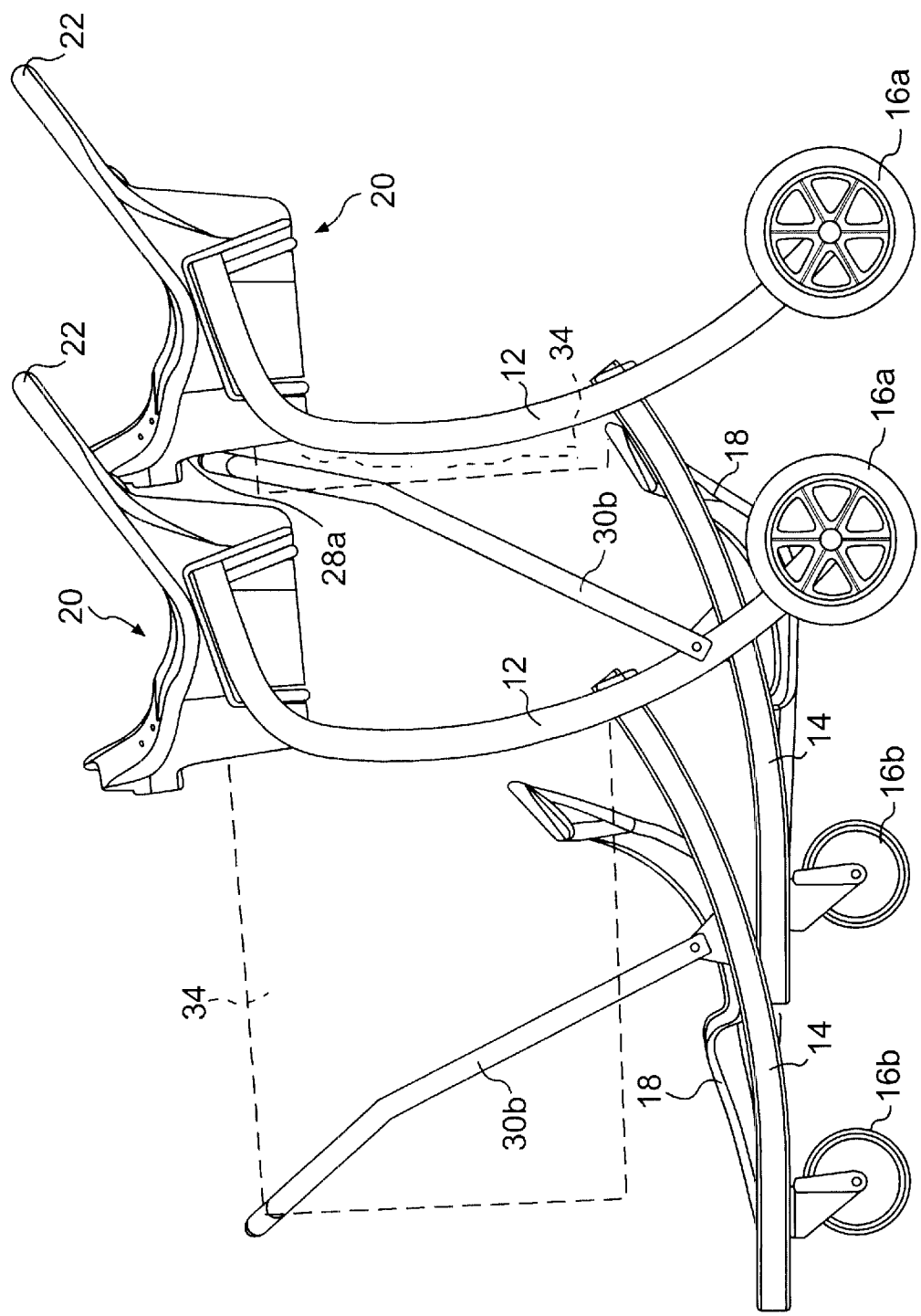

The bag may also be collapsed when placing the carts of the present invention in a nested position. Referring to FIGS. 4a–4c, a first car can be nested with a second cart in such a manner that the pivoting U-shaped bar 30 of the first cart, contacting portions of the second card, automatically retracts the U-shaped bar 30 and collapses the bag. More specifically, FIG. 4a shows two carts of the present invention separated from one another, but in a position to be nested. To collapse the bag, the carts are moved a predetermined distance. FIG. 4b shows the two carts in a semi-nested position. In this position, the transverse portion 30a of the U-shaped bar 30 contacts a portion of the seat assembly 20, and more specifically a front portion of the seat, itself. As the carts become nested, as shown in FIG. 4c, the pivoting U-shaped bar 30 is completely retracted such that the bag is automatically placed in the closed position from the open position.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A cart having wheels, comprising:
   a frame member including an upright frame portion and a lateral frame portion;
   a platform attached to the lateral frame portion;
   a stationary seat assembly rigidly secured to the upright frame portion, the stationary seat assembly including:
   a rearwardly facing stationary seat having a backrest;
   a handle positioned towards a front portion of the rearwardly facing stationary seat; and
   a safety bar positioned between the rearwardly facing stationary seat and the handle;
   a pivoting mechanism hingedly mounted to the lateral frame portion of the frame member remotely from the upright frame portion, the pivoting mechanism being moveable between a substantially upright position and a retracted position and being located, in both the substantially upright position and the retracted position, relative to a back portion of the backrest such that the rearwardly facing stationary seat is positioned between the handle and the pivoting mechanism; and
   a flexible receptacle attached to the pivoting mechanism and one of the stationary seat assembly and the upright frame member, wherein
   the pivoting mechanism moves the flexible receptacle between an open position and a collapsed position when the pivoting mechanism is moved between the substantially upright position and the retracted position, respectively, and
   the rearwardly facing stationary seat and the platform is accessible for use when the pivoting mechanism is in either the substantially upright position or the retracted position.

2. The cart of claim 1, wherein the stationary seat assembly is an integrally formed assembly.

3. The cart of claim 1, further comprising mounting brackets mounted to the lateral frame member such that the pivoting mechanism is hingedly mounted to the mounting brackets.

4. The cart of claim 3, wherein the pivoting mechanism is a U-shaped bar having legs and a transverse portion extending between the legs, the legs being hingedly mounted to respective mounting brackets.

5. The cart of claim 3, further comprising a stay mounted to the mounting brackets, the stay contacting at least one leg of the legs of the U-shaped bar in order to prevent the pivoting mechanism from extending past the substantially upright position.

6. The cart of claim 1, wherein the pivoting mechanism is a U-shaped bar having legs and a transverse portion extending between the legs, the legs being hingedly mounted to the lateral frame portion.

7. The cart of claim 6, wherein the transverse bar is positioned below the handle in the substantially upright position or the retracted position.

8. The cart of claim 6, wherein the backrest includes an indentation and the transverse portion is nested within the indentation when the pivoting mechanism is in the retracted position.

9. The cart of claim 1, wherein the pivoting mechanism, in the substantially upright position, is at an angle positioned away from the upper frame portion.

10. The cart of claim 8, wherein the flexible receptacle prevents the pivoting mechanism from extending past the substantially upright position.

11. The cart of claim 1, further comprising an auxiliary bag attached to the flexible receptacle.

12. The cart of claim 11, wherein the auxiliary bag is opened and closed independently of the flexible receptacle.

13. The cart of claim 1, wherein the flexible receptacle extends only partially along the platform when in the open position.

14. The cart of claim 1, wherein the platform is accessible in both a horizontal and vertical direction when the pivoting mechanism is in either the substantially upright position and the retracted position.

15. A cart, comprising:
- a frame member rotatably mounted to wheels;
- a stationary seat assembly rigidly secured to the frame member, the stationary seat assembly including:
  - a rearwardly facing stationary seat;
  - a handle positioned towards a front portion of the rearwardly facing stationary seat; and
  - a safety bar positioned between the rearwardly facing stationary seat and the handle;
- a pivoting mechanism hingedly mounted to the frame member remotely from an upright portion of the frame member, the pivoting mechanism being moveable between a substantially upright position and a retracted position, and being located relative to a back portion of the rearwardly facing stationary seat; and
- a flexible receptacle attached to the pivoting mechanism, wherein
  - the pivoting mechanism moves the flexible receptacle between an open position and a closed position when the pivoting mechanism is moved between the substantially upright position and the retracted position, respectively, and
  - the rearwardly facing stationary seat is accessible for use when the pivoting mechanism is in either the substantially upright position or the retracted position.

16. The cart of claim 15, further comprising a platform attached to a lateral frame portion of the frame member, the platform being accessible in both a horizontal and vertical direction when the flexible receptacle is in either the open position or the closed position.

17. The cart of claim 15, wherein the rearwardly facing stationary seat is accessible for use when the flexible receptacle is in either the open position or the closed position.

18. The cart of claim 15, wherein the rearwardly facing stationary seat is positioned between the handle and the pivoting mechanism, in either the substantially upright position or the retracted position.

19. The cart of claim 15, wherein the rearwardly facing stationary seat includes a backrest portion, the pivoting mechanism being positioned forward of the backrest portion and towards a front portion of the cart in either the substantially upright position or the retracted position.

20. The cart of claim 19, wherein a rearward side of the backrest portion includes an indentation such that the pivoting mechanism is nested within the indentation when the pivoting mechanism is in the retracted position.

21. A nestable cart, comprising:
- a frame member including an upright frame portion and a lateral frame portion;
- a stationary seat assembly rigidly secured to the upright frame portion, the stationary seat assembly including:
  - a rearwardly facing stationary seat having a backrest;
  - a handle positioned towards a front portion of the rearwardly facing stationary seat; and
  - a safety bar positioned between the rearwardly facing stationary seat and the handle;
- a pivoting mechanism hingedly mounted to the lateral frame portion of the frame member remotely from the upright frame portion, the pivoting mechanism being moveable between a substantially upright position and a retracted position and being located relative to a back portion of the backrest such that the rearwardly facing stationary seat is positioned between the handle and the pivoting mechanism; and
- a flexible receptacle attached to the pivoting mechanism and one of the stationary seat assembly and the upright frame member, wherein
  - upon nesting the cart with a substantially identical cart, the pivoting mechanism retracts automatically from the substantially upright position to the retracted position and the flexible receptacle moves to a collapsed, closed position from an open position.

22. A method of closing a collapsible receptacle on a cart having a pivoting mechanism, comprising he steps of:
- providing a first cart and a second cart each including:
  - a frame member including an upright frame portion and a lateral frame portion;
  - a rearwardly facing stationary seat assembly rigidly secured to the upright frame portion;
  - the pivoting mechanism hingedly mounted to the lateral frame portion of the frame member which is moveable between a substantially upright position and a retracted position and located such that the pivoting mechanism is positioned behind the rearwardly facing stationary seat assembly; and
  - the flexible receptacle is attached to the pivoting mechanism and one of the rearwardly facing stationary seat assembly and the upright frame member; and
- moving the first cart in a first direction a predetermined distance towards the stationary seat assembly of the second cart such that:
  - initially the stationary seat assembly of the second cart begins to contact the pivoting mechanism of the first cart;
  - then the stationary seat assembly begins to move the pivoting mechanism of the first cart towards the stationary seat of the first cart due to the continued movement of the first cart in the first direction and the contact between the pivoting mechanism of the first cart and the seat assembly of the second cart; and
  - the first cart is moved the predetermined distance such that the contact between the pivoting mechanism of the first cart and the seat assembly of the second cart moves the pivoting mechanism to the retracted position resulting in the flexible receptacle being collapsed or closed, the flexible receptacle and the pivoting mechanism of the first cart being positioned between the stationary seat assembly of both the first cart and the second cart.

23. The method of claim 22, wherein the rearwardly facing stationary seat assembly is provided with:
- a rearwardly facing stationary seat having a backrest;
- a handle positioned towards a front portion of the rearwardly facing stationary seat; and
- a safety bar positioned between the rearwardly facing stationary seat and the handle; and
- the pivoting mechanism is located relative to a back portion of the backrest such that the rearwardly facing stationary seat is positioned between the handle and the pivoting mechanism.

* * * * *

UNITED STATES PATENT AND TRADEMARK OFFICE
CERTIFICATE OF CORRECTION

PATENT NO. : 6,669,212 B2  Page 1 of 1
DATED : December 30, 2003
INVENTOR(S) : Terrill Porter It is certified that error appears in the above-identified patent and that said Letters Patent is hereby corrected as shown below:

<u>Title page,</u>
Item [75], Inventor, change "Teril" to -- Terrill --.

Signed and Sealed this

Twenty-fourth Day of February, 2004

JON W. DUDAS
*Acting Director of the United States Patent and Trademark Office*